(12) United States Patent
Grohmann et al.

(10) Patent No.: US 10,264,628 B2
(45) Date of Patent: Apr. 16, 2019

(54) GRIPPING APPARATUS

(71) Applicant: Deutsches Zentrum für Luft- und Raumfahrt e.V., Köln (DE)

(72) Inventors: Yannis Grohmann, Hamburg (DE); Fabian Zacharias, Dresden (DE)

(73) Assignee: DEUTSCHES ZENTRUM FUERLUFT-UND RAUMFAHRT E.U., Cologne (DE)

( * ) Notice: Subject to any disclaimer, the term of this patent is extended or adjusted under 35 U.S.C. 154(b) by 656 days.

(21) Appl. No.: 14/807,509

(22) Filed: Jul. 23, 2015

(65) Prior Publication Data

US 2016/0029437 A1 Jan. 28, 2016

(30) Foreign Application Priority Data

Jul. 24, 2014 (DE) .................. 10 2014 110 464

(51) Int. Cl.

| | |
|---|---|
| *H05B 3/28* | (2006.01) |
| *B29C 35/02* | (2006.01) |
| *B29C 70/38* | (2006.01) |
| *H05B 1/02* | (2006.01) |
| *H05B 3/03* | (2006.01) |
| *B25J 15/06* | (2006.01) |
| *B29C 31/08* | (2006.01) |
| *B25J 15/00* | (2006.01) |
| *B29K 105/08* | (2006.01) |

(52) U.S. Cl.
CPC ............ *H05B 3/286* (2013.01); *B25J 15/008* (2013.01); *B25J 15/0071* (2013.01); *B25J 15/0076* (2013.01); *B25J 15/0085* (2013.01); *B25J 15/06* (2013.01); *B29C 31/08* (2013.01); *B29C 35/0272* (2013.01); *B29C 70/38* (2013.01); *H05B 1/02* (2013.01); *H05B 3/03* (2013.01); *B29C 31/085* (2013.01); *B29K 2105/089* (2013.01); *B29K 2995/0005* (2013.01)

(58) Field of Classification Search
CPC ... H05B 3/286; H05B 3/03; H05B 1/02; B25J 15/0071; B25J 15/0076; B25J 15/008; B25J 15/0085; B25J 15/06; B29C 31/08; B29C 31/085; B29C 35/0272; B29C 70/38; B29K 2105/089; B29K 2995/0005; B25B 11/00
See application file for complete search history.

(56) References Cited

U.S. PATENT DOCUMENTS

| | | | | |
|---|---|---|---|---|
| 9,308,650 B2* | 4/2016 | Eisele | ................ | B25J 15/0071 |
| 2014/0207135 A1* | 7/2014 | Winter | ............... | A61B 18/1445 |
| | | | | 606/40 |

FOREIGN PATENT DOCUMENTS

| | | |
|---|---|---|
| DE | 103 53 070 A1 | 6/2005 |
| DE | 10 2011 114 015 A1 | 12/2012 |
| DE | 10 2012 019 915 A1 | 4/2014 |
| WO | 2011048216 A1 | 4/2011 |
| WO | 2014033021 A2 | 3/2014 |

* cited by examiner

*Primary Examiner* — Shawntina Fuqua
(74) *Attorney, Agent, or Firm* — W&C IP

(57) ABSTRACT

A gripping apparatus is disclosed for gripping and holding electrically conductive, textile materials. The gripping apparatus includes a gripping device which has a gripping face for gripping and holding the textile material. With the aid of an electrical contact device, electrodes can be brought into contact with the textile material in order to bring about a current flow in the textile material.

14 Claims, 3 Drawing Sheets

GRIPPING APPARATUS

FIELD OF THE INVENTION

The invention relates to a gripping apparatus for gripping and holding electrically conductive, textile materials. The invention also relates to a laying apparatus for laying textile materials for this purpose, and to a method for producing a textile preform from electrically conductive, textile material layers.

BACKGROUND

In particular in the production of fiber composite components, which are generally produced from a fiber material which is embedded in a thermally cured matrix material, the (dry or preimpregnated) semifinished fiber products are often introduced into a molding tool which has at least partially the subsequent component geometry. The semifinished fiber product preform (also known as fiber preform) produced in the process then usually has a near-net-shape component geometry, such that the fiber composite component can be produced by curing the matrix material (for example thermoplastic or thermosetting matrix systems).

In the production of such semifinished fiber product preforms, a plurality of semifinished fiber product layers are often laid on top of one another in the molding tool in order in this way to already achieve the necessary component thickness in the preform. In this case, there is a need to automate this process step of the production of the semifinished fiber product preform as much as possible, in order to be able to produce such a preform as quickly and reliably as possible in an industrial context.

Semifinished fiber products within the meaning of the present invention can be for example UD fiber tapes, woven fabrics, laid fabrics, dry binder-coated carbon fibers and prepregs (thermosetting and thermoplastic prepregs) or other electrically conductive fibers or fibers having electrically conductive additives (e.g. glass fiber prepregs having nano additives).

DE 10 2012 019 915 A1 discloses a method for providing a fiber preform for producing a fiber composite component and also a transport device for a fiber material blank, in which the fiber material to be transported is clamped in a transport device and energized during transport to a molding tool, in order to already control its temperature during transport. As a result, in particular the drapability of the fiber material blank to be transported is intended to be improved.

DE 103 53 070 A1 discloses a method and an apparatus for binder activation on semifinished fiber products, in which electrical contacts are arranged on the semifinished fiber product or the preform, such that a current flow is brought about in the preform, resulting in the temperature of the preform being controlled and thus in binder activation.

WO 2014/033021 A2 discloses a gripping apparatus which has an electro-adhesive gripping device by way of which the semifinished fiber products to be transported can be picked up and transported by means of an adhesion force. The gripping face of the electro-adhesive gripping device is in this case configured at least partially in a deformable manner such that it can adapt to the corresponding final contours of the materials to be transported.

However, the grippers based on the adhesion principle have the disadvantage that the detachment of the usually flexible textile materials often takes some time, and so it is possible to travel at only very low laying speeds here. Furthermore, in a multiplicity of semifinished fiber product layers to be deposited on top of one another, the correct arrangement of the individual layers within the preform can no longer be ensured in a reliable manner, since material displacements can occur during the deposition operation or the operation of detachment from the gripping face.

SUMMARY

It is therefore an object of the present invention to specify an improved gripping apparatus by way of which in particular semifinished fiber products can be transported in a reliably gripped manner and can be deposited quickly. It is likewise an object of the present invention to specify an improved method for producing textile preforms, with which a textile preform can be produced reliably and quickly by depositing textile material layers on top of one another.

The object is achieved according to the invention by way of a gripping apparatus and a corresponding laying apparatus. The object is otherwise achieved according to the invention by way of a method.

A gripping apparatus is disclosed which has a gripping device with a gripping face for gripping and holding textile material or material layers. The gripping face of the gripping device is configured in this case such that it can grip and hold the textile material on only one side of the textile, without for this purpose requiring a clamping counterpiece which bears against the opposite side of the textile material. Rather, the gripping device having the gripping face as an area gripper is configured such that the gripping face grips the textile material on one side so that the textile material is gripped and held by the gripping face only with its side facing the gripping face.

Examples of such gripping devices which, in the form of area grippers, can grip textile materials, are for example adhesive grippers, electro-adhesive grippers, suction grippers, Bernoulli grippers, magnetic grippers, freezing grippers and/or needle grippers. Thus, for example in the case of an electro-adhesive gripper, an electro-adhesive force is exerted on the textile material in the direction of the gripping face such that the textile material can be gripped and held by the gripping face by means of electro-adhesion. In adhesive grippers, also known as gecko grippers, the basic adhesive capability of bodies, that is to say between the gripper and the textile material, is exploited in order to hold the gripped article.

The invention proposes that the gripping apparatus has an electrical contact device which has at least one electric electrode which is connectable to a source of electric power in order to apply an electric voltage. The electric electrode is configured in this case to come into contact with the textile material and interacts with a corresponding counterelectrode such that, when an electric voltage is applied, a current flow in the textile material is brought about when the electrode and the counterelectrode come into contact with the textile material. Thus, the electric electrode can for example come into electric contact with the textile material during the gripping, holding and transporting and/or deposition of the textile material, in order in this way to bring about a current flow in the textile material in order to control the temperature of the textile material during the gripping, transporting and/or depositing process. Preferably, contact is made only during the deposition of the textile material.

Textile materials can be in particular semifinished fiber products for producing fiber composite components, which have for example a fiber composite material or consist thereof.

With the gripping apparatus according to the invention, it is in particular possible, when depositing gripped and held semifinished fiber products, to bring about a current flow for temperature control within the semifinished fiber products to be deposited and optionally also further semifinished fiber products that have already been deposited, such that the semifinished fiber product(s) is/are heated in the corresponding region through which current flows. As a result of the temperature control of the semifinished fiber products at least locally in predefined regions, but also over the entire area, a binder material introduced into the semifinished fiber products can be activated during the deposition and the associated detachment process of the semifinished fiber products from the gripping face, or a thermoplastic material or a thermosetting matrix system can be melted, with the result that the semifinished fiber products deposited on top of one another for example in order to produce a preform are fixed together. As a result of the temperature control during the deposition and detachment process, a thermally activatable binder material is thus activated in order to stick the individual semifinished fiber products or semifinished fiber product layers together, or to stick or adhere at least the gripped semifinished fiber product layer to be deposited to already deposited semifinished products or to a deposition base (tool).

As a result, the correct positioning of the individual semifinished products to be laid can be ensured in a reliable manner. Furthermore, the present gripping apparatus according to the invention allows purely adhesive grippers to be employed in the case of flexible textile materials, since, as a result of the sticking of the gripped and held semifinished fiber products to already deposited semifinished fiber products, during the detachment process, the adhesive gripper can be detached without further measures from the held textile materials by a peeling operation. A peeling movement is not typically possible in flexible materials, since said flexible materials follow the peeling movement. This can be prevented by the sticking of the textile materials on account of the introduction of heat, such that the adhesive gripper or gecko gripper can be detached from the gripped textile material via a corresponding peeling operation.

A further advantage of area grippers, such as the electroadhesive grippers, for example, is the gentle gripping and holding of the textile materials. Precisely in comparison with grippers in which the material is held in a clamped manner, in the case of the area grippers of the present invention, fiber damage during the gripping and holding of the textile materials can be avoided. Furthermore, as a result of the sticking during the detachment of the textile materials, the risk of slipping can be avoided, and so very rapid gripping movements are possible in principle, resulting in a considerable increase in process cycles without losses of quality having to be accepted.

According to one advantageous embodiment, the gripping device can be configured as an adhesive gripper, electro-adhesive gripper, suction gripper, Bernoulli gripper, magnetic gripper, freezing gripper and/or needle gripper.

According to a further advantageous embodiment, the at least one electric electrode is arranged within the gripping face of the gripping device. The gripping face does not necessarily have to be continuous in this case, but can be interrupted by intermediate regions in which one or more electric electrodes are arranged, for example. Within the meaning of the present invention, the gripping face is thus understood to be the entirety of the face by way of which the textile material can be gripped in an a real manner on one side. This entire gripping face can in this case consist of a plurality of individual and also mutually independent partial gripping faces. It is possible in this case for one or more electric electrodes to be arranged within the gripping face such that the temperature of the semifinished fiber products is controlled and thus the semifinished fiber product to be deposited is stuck in the immediate vicinity of the gripping faces, in order in this way to improve the detachment of the gripped textile material from the gripping face.

According to one advantageous embodiment, it is thus advantageous for the electrical contact device to have a plurality of electric electrodes and/or counterelectrodes, such that sticking points can be realized at a large number of discretely distributed points on the textile material surface, in order in this way to prevent the textile material from slipping and to make detachment easier.

According to one advantageous embodiment, it is advantageous to this end for the electrical contact device to have a control unit which is set up to switch the application of an electric voltage to the electric electrode such that either an electric voltage for bringing about a current flow in the textile material is applied simultaneously to all electric electrodes or that an electric voltage for bringing about a current flow in the textile material is applied to the electric electrodes or pairs of electric electrodes in each case temporally in succession.

Thus, the first alternative proposes that an electric voltage is applied to all electrodes simultaneously for a certain duration or period of time, such that a current flow from all electrodes in the direction of the one or more counterelectrodes is brought about.

According to the second alternative of the embodiment, the electric voltage is not applied simultaneously to all electrodes but each electrode (or pair of electrodes) is switched in succession such that an electric voltage is only ever applied to one electrode (or pair of electrodes) at a time. In other words, each electrode (or pair of electrodes) is switched such that an electric voltage is applied thereto for a defined duration, while no electric voltage is applied to the other electrodes.

As a result, the advantage is achieved that a defined current flow can be ensured at any time, and so the required energy input for temperature control and optionally binder activation can be ensured. Thus, the current flow always flows in a defined manner via selected electrodes and generates heat input only where it is required.

Thus, for example each electrode (or pair of electrodes) can be attached to a capacitor/supercap as a source of electric power, so as to ensure, during discharging, that the corresponding amount of power drains off.

Within the meaning of the invention, the term "counterelectrode" means in this case an electric electrode which serves as a counterpiece for the electric electrode for bringing about the current flow. The counterelectrode can be for example an electric electrode outside the gripping apparatus, for example the electrically conductive surface of a molding tool, such that a current flow can be brought about from the electrode(s) of the gripping apparatus, through the textile material layers, to the tool surface as counterelectrode. However, a counterelectrode can also be an electrode of the gripping apparatus, such that a current flow can be brought about from an electrode of the gripping apparatus, through the textile material, to an electrode as counterelectrode of the gripping apparatus. The counterelectrode is thus an electrode which can be a constituent part of the gripping apparatus, but does not have to be.

According to one advantageous embodiment, the at least one electric electrode, preferably all the electric electrodes, is/are configured such that the electric contact face of the electrodes has smaller than 15 cm$^2$, preferably smaller than 5 cm$^2$, particularly preferably smaller than 1 cm$^2$. In combination with a multiplicity of electric electrodes with a small contact face, it is thus possible to input power into the textile material in a very short time in order in this way to ensure sticking and fixing of the textile material layers as a result of the temperature control. It has been found for example to be advantageous for a current flow through all electronic electrodes for a duration of less than 2 seconds, preferably less than 500 milliseconds, particularly preferably less than 100 milliseconds.

According to a further advantageous embodiment, the gripping device is configured to carry out a relative travel movement of the gripping face of the gripping device with respect to the at least one electrode, preferably all the electrodes, of the electrical contact device. As a result, it is possible for the electric electrodes to only come into contact with the gripped and held textile material when this is actually necessary for bringing about the current flow. As a result of the travel movement of the gripping face with respect to the electrodes, it is possible for the electrodes to come into contact with the textile material or else to lose contact again on account of the travel movement of the gripping face. It is therefore very particularly advantageous for the gripping apparatus to be configured such that, during the gripping and holding and transporting of the textile material, the electrodes of the electrical contact device of the gripping apparatus are not in contact with the text of textile material and only come into electric contact with the textile material when the textile material is deposited, in order to bring about the current flow. Advantageously, as a result of the relative travel movement, the electrodes apply a force to the semifinished fiber products.

According to one advantageous embodiment in this respect, the gripping device has at least one actuator which is configured to actively carry out the relative travel movement of the gripping face. The gripping face can thus be actively moved by means of an actuator, which can be controlled by a control unit, specifically in a relative manner with respect to the electric electrodes, such that the electric electrodes can come into contact with the textile material on account of the active travel movement of the gripping face.

According to a further embodiment, the gripping device has at least one spring element which is configured to passively carry out a relative travel movement of the gripping face when a force acts on the gripping face. The spring element is preferably configured such that, in a relaxed or neutral position, it holds the gripping faces in such a way that the electric electrodes are not in contact with the textile material. Thus, the textile material can be gripped, held and transported without the electrodes coming into contact with the textile material. When the textile materials are deposited, a force is exerted on the gripping faces such that the gripping face carries out a relative movement with regard to the electrodes when the exerted force is greater than the opposing force of the spring element. In this case, the gripping face is moved relative to the electrodes counter to the spring force of the spring element until the electrodes come into contact with the textile material such that a current flow can be brought about.

A spring element can be for example a spring, for example a steel spring. A spring element can preferably also consist of an elastically deformable plastics material, for example foam, which returns to its original shape after being subjected to a force.

According to one embodiment, on account of the lifting movement, the contact face of the electric electrodes is thus aligned with the gripping face or moved beyond the latter, resulting in a pressure force of the electrodes on the textile material such that the electric electrodes come into contact with the textile material. In a starting position, or neutral position, the contact faces of the electric electrodes are not aligned with the gripping face of the gripping device and are thus not electrically in contact. Only as a result of the travel movement is the contact face of the electric electrodes brought into alignment with the gripping face or beyond the latter.

According to one advantageous embodiment, it is also conceivable for the electrical contact device to have at least one actuator which is configured to carry out a relative travel movement of the at least one electrode of the electrical contact device with respect to the gripping face of the gripping device. In this exemplary embodiment, the gripping face of the gripping device is preferably arranged rigidly on the gripping apparatus, while the electric electrodes are embodied to be movable back and forth by means of the at least one actuator. Thus, the electric electrodes are brought into alignment with the gripping face in order to come into contact with the textile material.

However, it is also conceivable for both the gripping face and the electrodes to be embodied in a movable manner. Preferably, a surface pressure of >1 bar is applied by the electrodes.

The object is also achieved by a laying apparatus for laying textile material for producing a textile preform, wherein the textile material is intended to be introduced into the molding tool with the aid of the above-described gripping apparatus. As a result of a plurality of layers of textile materials (textile material layers), for example semifinished fiber product layers, being built up, the textile preform can be built up. As a result of the current flow brought about by means of the electrodes of the gripping apparatus, the individual material layers can be fixed at particular, predefined points.

Advantageously, in this case, the tool surface is configured to be at least partially, preferably entirely, electrically conductive, and thus forms the counterelectrode such that a defined current flow through all of the already deposited textile material layers can be brought about for temperature control and optionally binder activation.

The object is otherwise achieved by means of a method for producing a textile preform from electrically conductive, textile material layers. In this case, first of all textile material layers are picked up by means of the above mentioned gripping apparatus, held and then transported to a provided molding tool. Subsequently, the textile material layers are deposited, wherein, during the deposition of the textile material layers, at least one electric electrode of the gripping apparatus is brought into contact with the textile material layers to be deposited, and a current flow in at least the textile material layer to be deposited is brought about for temperature control by application of an electric voltage.

Advantageously, the electric electrodes are brought into contact with the molding tool only when the textile material layers are deposited in or on the latter, and are not brought into contact with the textile material layer during the picking up and holding and transporting operations.

Other advantageous embodiments are also disclosed herein.

As a result of a large number of small electrodes, temperature control also takes place only in the region of the electrodes and/or in the region of the current flow, and so only small activation points arise between the layers. This is advantageous during the subsequent forming of the planar, fixed preforms, since the latter can then be formed better.

Advantageously, the planar preform is built up and fixed and subsequently three-dimensionally formed.

BRIEF DESCRIPTION OF THE DRAWINGS

The invention is explained in more detail by way of example and with reference to the appended drawings, in which.

DETAILED DESCRIPTION

Figure 1:
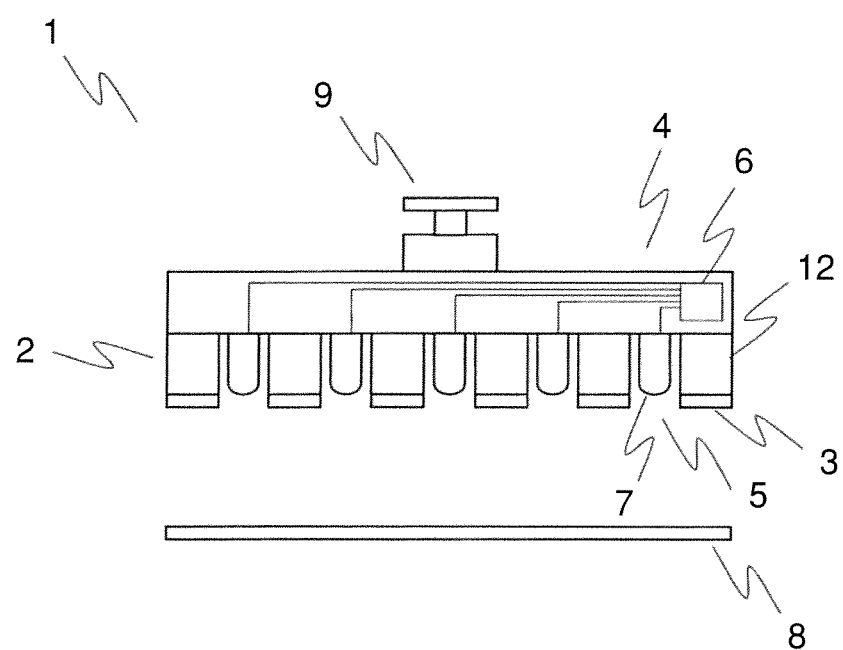
FIG. 1—shows a schematic illustration of a gripping apparatus according to the invention.

FIG. 1 schematically shows the gripping apparatus 1, by way of which electrically conductive, textile materials, such as semifinished fiber products for producing fiber composite components, are intended to be gripped and held.

The gripping apparatus 1 has a gripping device 2, which has a gripping face 3, which faces the textile material to be gripped and is configured to grip and hold the textile material. The gripping face 3 of the gripping device 2 is subdivided into a plurality of partial gripping faces in the exemplary embodiment in FIG. 1.

The gripping apparatus 1 furthermore has an electrical contact device 4, which has a plurality of electric electrodes 5 which are arranged between the individual partial gripping faces 3 of the gripping apparatus 2.

The individual electrodes 5 of the electrical contact device 4 are in this case connected to a control unit 6 in order in this way to be able to switch the application of an electric voltage by means of a source of electric power (not illustrated). Thus, it is for example conceivable for the individual electrodes 5 to be switched temporally in succession such that an electric voltage is always applied to one electrode 5 in each case temporally in succession.

FIG. 1 schematically shows the gripping apparatus 1 in the state in which a textile material is not being gripped or held. The gripping face 3 is in this case not aligned with the contact faces 7 of the electrodes 5, and so the contact faces 7 of the electrodes 5 would not come into contact with the textile material during gripping and holding of a textile material.

Figure 2:
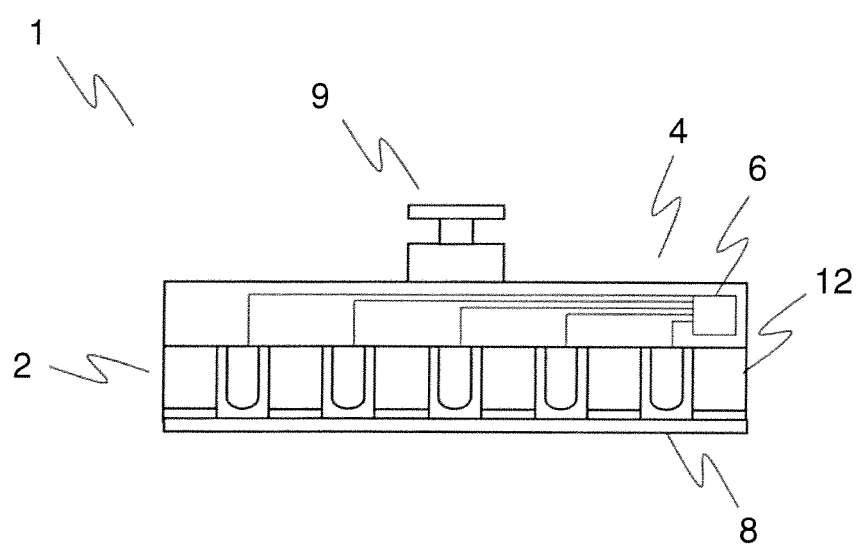
FIG. 2—shows a schematic illustration of the gripping apparatus with a gripped textile material.

FIG. 2 schematically shows the gripping apparatus 1 from FIG. 1, wherein a textile material 9 is now being gripped and held by the gripping faces 3 of the gripping device 2. It can be seen in this exemplary embodiment that the contact faces 7 of the electrodes 5 are not in contact with the textile material.

The gripping device 2 can be configured for example as an adhesive gripper, electro-adhesive gripper, suction gripper, Bernoulli gripper, magnetic gripper, freezing gripper and/or needle gripper. Preferably, the gripping face 3 is an electro-adhesive film which is provided with a plurality of conductor tracks for example from a flexible film. By applying very high voltages to these conductor tracks, textiles resting against the film can be gripped such that an electro-adhesive force acts on the textile material 8 in the direction of the gripping apparatus 1.

If the entire gripping face 3 were larger than the blank to be gripped, use can be made for example of holding-down means (not illustrated) which push away the non-required edges of the gripping face 3. Since the attractive force for example in the case of the electrostatic gripping principle depends enormously on distance, the attractive forces for the peripheral regions are reduced to such an extent that the latter are no longer gripped.

The individual partial gripping faces of the gripping face 3 can be controllable for example independently of one another such that for example different partial gripping faces are switchable on and off. As a result, different semifinished fiber products can be gripped and deposited in a defined manner on a conducting or non-conducting deposition plate.

The gripping apparatus 1 has a fastening device 9, by way of which the gripping apparatus 1 can be fastened for example to a robot unit. As a result, it is possible for the textile materials to be able to be transported by means of the robot from a fiber providing means to a molding tool in order in this way to create a textile preform. The gripping apparatus 1 is thus adaptable to the particular situation in an extremely flexible manner.

Figure 3:
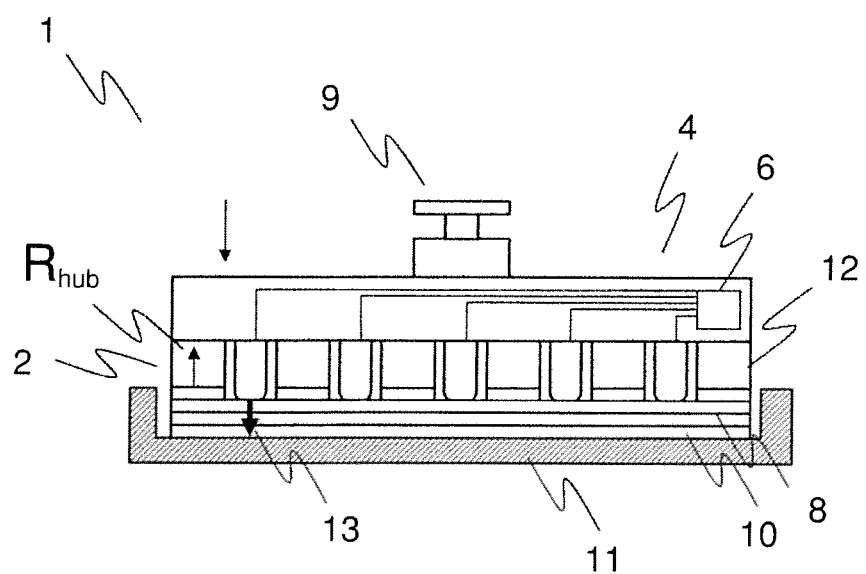
FIG. 3—shows a schematic illustration of the gripping apparatus during the deposition of the textile material.

FIG. 3 schematically shows the process of depositing the picked-up textile material 8 onto already deposited textile materials 10 which have been deposited in a molding tool 11 in order to produce a preform.

In order to improve the deposition process, the gripping device 2 has spring elements 12, which may be for example an elastomeric material (for example foam). As a result, it is possible for the gripping face 3 to be able to carry out a travel movement in the direction $R_{Hub}$ with respect to the stationary electrodes 5, in order in this way to bring the contact faces 7 of the electrodes 5 into contact with the textile material 8.

For this purpose, the gripping apparatus 1 is pushed in the direction of the already deposited textile materials 10 during the deposition of the picked-up textile material 8, wherein the pressure force with which the gripping apparatus 1 is pushed in the direction of the already deposited fiber materials 10 is greater than the spring force of the spring element 12. The spring element 12 is then compressed, wherein the gripping face 3 in this case carries out a relative travel movement in the direction $R_{Hub}$ with respect to the electrodes 5, specifically until the contact faces of the electrodes 5 are aligned with the gripping face 3 and the electrodes thus come into electric contact with the textile material 8.

As shown in FIG. 3, the electrodes 5 come into contact with the textile material 8 such that a current flow to a counterelectrode can be brought about by application of a voltage. In the exemplary embodiment in FIG. 3, the molding tool 11 is in this case configured in an electrically conducting manner such that the molding tool 11 forms the counterelectrode. By application of a voltage, it is thus possible for a current flow to be brought about in a defined manner through the individual layers of the textile materials 8, 10, such that temperature control takes place in these regions. In this case, for example binder materials can be thermally activated so that the textile material 8 to be deposited is stuck to the already deposited textile materials 10. The gripping apparatus 1 can now be removed without the material layers slipping, and be detached from the textile material 8.

It is also conceivable for the gripping device, rather than spring elements, to have active actuators in order to generate a relative movement of the gripping face 3 with respect to the electrodes 5. It is also conceivable for the electrodes themselves to be connected to actuators in order to carry out a relative movement with respect to the gripping faces 3.

Furthermore, it is conceivable for the electrodes to be pushed onto the textile materials by continued application of a contact pressure force, such that the textile materials are compacted in the region of the electrodes 5. As a result, the current flow can take place in a more defined manner.

Thus, a gripping apparatus which has one or more individual gripping faces and one or more associated, individually controllable electrodes for local binder activation for the purpose of sticking semifinished fiber products together is proposed. The gripping faces and the electrodes are in this case movable relative to one another. The relative movement can take place passively, in that for example a robot pushes the gripper onto a surface and parts of the gripper yield. The relative movement can also take place actively by way of drives which move the gripping faces and/or the electrodes.

The current flow can run either perpendicularly through one or more fiber layers or in the fiber plane. A large number of electrodes per face allows a large number of fixing points, without the costs for the gripper being increased considerably thereby. The electrodes can in this case be controlled individually such that the current flow always flows in a defined manner via selected electrodes and only generates heat and only consumes energy where it is required.

It is furthermore conceivable for the resistances applied to the electrodes to be measured before a current flow is generated. This allows optimal process parameters for the fixing operation to be set automatically. If the electrodes do not make contact with a fiber material, this is sensed and these electrodes are no longer energized in the following step.

The gripping face can be flexible and thus adapt to the contours or irregularities of the textile material to be gripped. The gripping face can additionally contain holes in order to favor lifting or releasing of the item to be gripped, in that an air stream is generated for example through the holes.

In order to avoid damage to the textile materials, the electrical power can be introduced in a pulsed form.

If, for example, the electrodes are likewise movable via actuators relative to the gripping faces, then after the electrodes have been brought into contact with the textile material, the electrode can be moved in the direction of the textile material in order to apply a pressure thereto, resulting in the electrode pushing against the deposited textile material. As a result, the contact resistance is reduced and a current can flow between the electrode, the textile material and a counterelectrode.

LIST OF REFERENCE SIGNS

1 Gripping apparatus
2 Gripping device
3 Gripping face
4 Electrical contact device
5 Electrode
6 Control unit
7 Contact face
8 Textile material
9 Fastening device
10 Deposited textile materials
11 Molding tool
12 Spring element
13 Current flow

We claim:

1. A gripping apparatus for gripping and holding electrically conductive, textile materials, comprising
    a gripping device which has a gripping face that faces a textile material to be gripped and is configured to grip and hold the textile material; and
    an electrical contact device which has at least one electric electrode that is connectable to a source of electric power in order to apply an electric voltage, said at least one electric electrode being configured to come into electrical contact with the textile material and interacting with at least one electric counterelectrode such that a current flow in the textile material between the at least one electric electrode and the at least one electric counterelectrode is brought about for temperature control when the at least one electric electrode and the at least one electric counterelectrode have been brought into contact with the textile material,
    wherein the gripping device is configured to carry out a relative travel movement of the gripping face of the gripping device with respect to the at least one electric electrode of the electrical contact device.

2. The gripping apparatus according to claim 1, wherein the gripping device is configured as one or more of an adhesive gripper, electro-adhesive gripper, suction gripper, Bernoulli gripper, magnetic gripper, freezing gripper and needle gripper.

3. The gripping apparatus according to claim 1, wherein the at least one electric electrode is arranged within the gripping face of the gripping device.

4. The gripping apparatus according to claim 1, wherein the at least one electric electrode includes a plurality of electric electrodes.

5. The gripping apparatus according to claim 4, wherein the electrical contact device includes a control unit which is configured to switch the application of the electric voltage to the plurality of electric electrodes such that either
    the electric voltage for bringing about a current flow in the textile material is applied simultaneously to all of the plurality of electric electrodes or
    the electric voltage for bringing about a current flow in the textile material is applied to the plurality of electric electrodes or pairs of electric electrodes temporally in succession.

6. The gripping apparatus according to claim 1, wherein the electrical contact device includes the at least one electric counterelectrode.

7. The gripping apparatus according to claim 1, wherein the at least one electric electrode has a contact face smaller than 15 cm$^2$.

8. The gripping apparatus according to claim 7, wherein the contact face of the at least one electric electrode is smaller than 5 cm$^2$.

9. The gripping apparatus according to claim 8, wherein the contact face of the at least one electric electrode is smaller than 1 cm$^2$.

10. The gripping apparatus according to claim 1, wherein the gripping device has at least one actuator which is configured to actively carry out the relative travel movement of the gripping face.

11. The gripping apparatus according to claim 1, wherein the gripping device has at least one spring element which is configured to passively carry out the relative travel movement of the gripping face when a force acts on the gripping face.

12. The gripping apparatus according to claim 1, wherein the electrical contact device has at least one actuator which is configured to carry out a relative travel movement of the at least one electric electrode of the electrical contact device with respect to the gripping face of the gripping device.

13. A laying apparatus for laying textile material for producing a textile preform, comprising
 a molding tool; and
 a gripping apparatus for laying the textile material in the molding tool, the gripping apparatus comprising
  a gripping device which has a gripping face that faces the textile material to be gripped and is configured to grip and hold the textile material, and
  an electrical contact device which has at least one electric electrode that is connectable to a source of electric power in order to apply an electric voltage, said at least one electric electrode being configured to come into electrical contact with the textile material and interacting with at least one electric counterelectrode such that a current flow in the textile material between the at least one electrode and the at least one counterelectrode is brought about for temperature control when the at least one electrode and the at least one counterelectrode have been brought into contact with the textile material,
  wherein the gripping device is configured to carry out a relative travel movement of the gripping face of the gripping device with respect to the at least one electric electrode of the electrical contact device.

14. The laying apparatus according to claim 13, wherein the molding tool has a tool surface in which the at least one counterelectrode is arranged or which forms the at least one counterelectrode.

\* \* \* \* \*